(12) United States Patent
Tang

(10) Patent No.: US 9,426,577 B2
(45) Date of Patent: Aug. 23, 2016

(54) MAGNETIC ASSEMBLY FOR SPEAKER

(71) Applicant: Yun Tang, Shenzhen (CN)

(72) Inventor: Yun Tang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 14/564,285

(22) Filed: Dec. 9, 2014

(65) Prior Publication Data

US 2016/0021461 A1     Jan. 21, 2016

(30) Foreign Application Priority Data

Jul. 17, 2014 (CN) ...................... 2014 2 0396005 U

(51) Int. Cl.
*H04R 9/02* (2006.01)
*H02K 41/035* (2006.01)
*H02K 1/34* (2006.01)

(52) U.S. Cl.
CPC ................ *H04R 9/025* (2013.01); *H02K 1/34* (2013.01); *H02K 41/0356* (2013.01)

(58) Field of Classification Search
CPC .............................. H04R 9/025; H04R 9/027
USPC ................. 381/412, 414, 416–418, 420–421
See application file for complete search history.

(56) References Cited

U.S. PATENT DOCUMENTS

| | | | | |
|---|---|---|---|---|
| 3,550,051 A | * | 12/1970 | Parker | H01F 7/0289 381/420 |
| 8,437,493 B2 | | 5/2013 | Nho et al. | |
| 2005/0190945 A1 | * | 9/2005 | Calderwood | H04R 9/025 381/412 |
| 2007/0121994 A1 | * | 5/2007 | Hayasaka | H04R 9/06 381/420 |

* cited by examiner

*Primary Examiner* — Suhan Ni
(74) *Attorney, Agent, or Firm* — IPro, PLLC; Na Xu

(57) ABSTRACT

A magnetic assembly for a speaker is disclosed in this disclosure. The magnetic assembly includes a yoke including a receiving space; a main magnet received in the receiving space and installed on the yoke; a pole plate received in the receiving space, and including a base plate attached on the main magnet and a sidewall extending substantially perpendicularly from a periphery of the base plate for increasing an overlapping area between the yoke and the pole plate.

8 Claims, 6 Drawing Sheets

MAGNETIC ASSEMBLY FOR SPEAKER

FIELD OF THE INVENTION

The present disclosure generally relates to electromagnetic technologies, and more particularly, to a magnetic assembly for a speaker.

DESCRIPTION OF RELATED ART

Speakers are widely applied in mobile devices, such as mobile phones, portable media players or laptop computers, for converting electrical signals into audible sounds. Generally, as U.S. Pat. No. 8,437,493 disclosed, a speaker includes a magnetic assembly and a voice coil. The magnetic assembly includes a yoke, a magnet installed on the yoke and a pole plate attached to the magnet. A magnetic gap is formed between the yoke and the magnet as well as the pole plate for receiving the voice coil. The magnetic field is evenly distributed in the magnetic gap between the yoke and the pole plate. However, the overlapping area between the yoke and the pole plate is too small, which leads to a lot of total harmonic distortion introduced into the speaker while the voice coil vibrates. This may lead to a poor performance of the speaker.

Therefore, the present disclosure provides an improved magnetic assembly to overcome the aforesaid problems.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present disclosure will be described in detail below with reference to the attached drawings and embodiments thereof.

Figure 1:
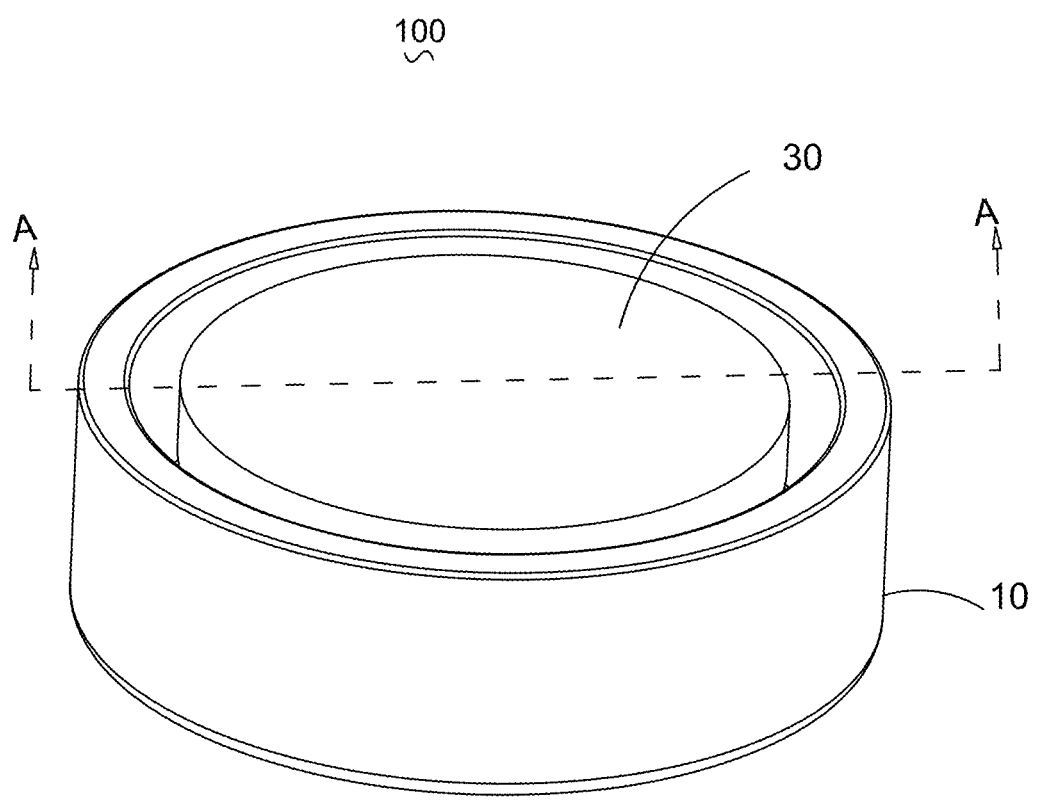
FIG. 1 is an isometric view of a magnetic assembly in accordance with a first embodiment of the present disclosure.
Figure 2:
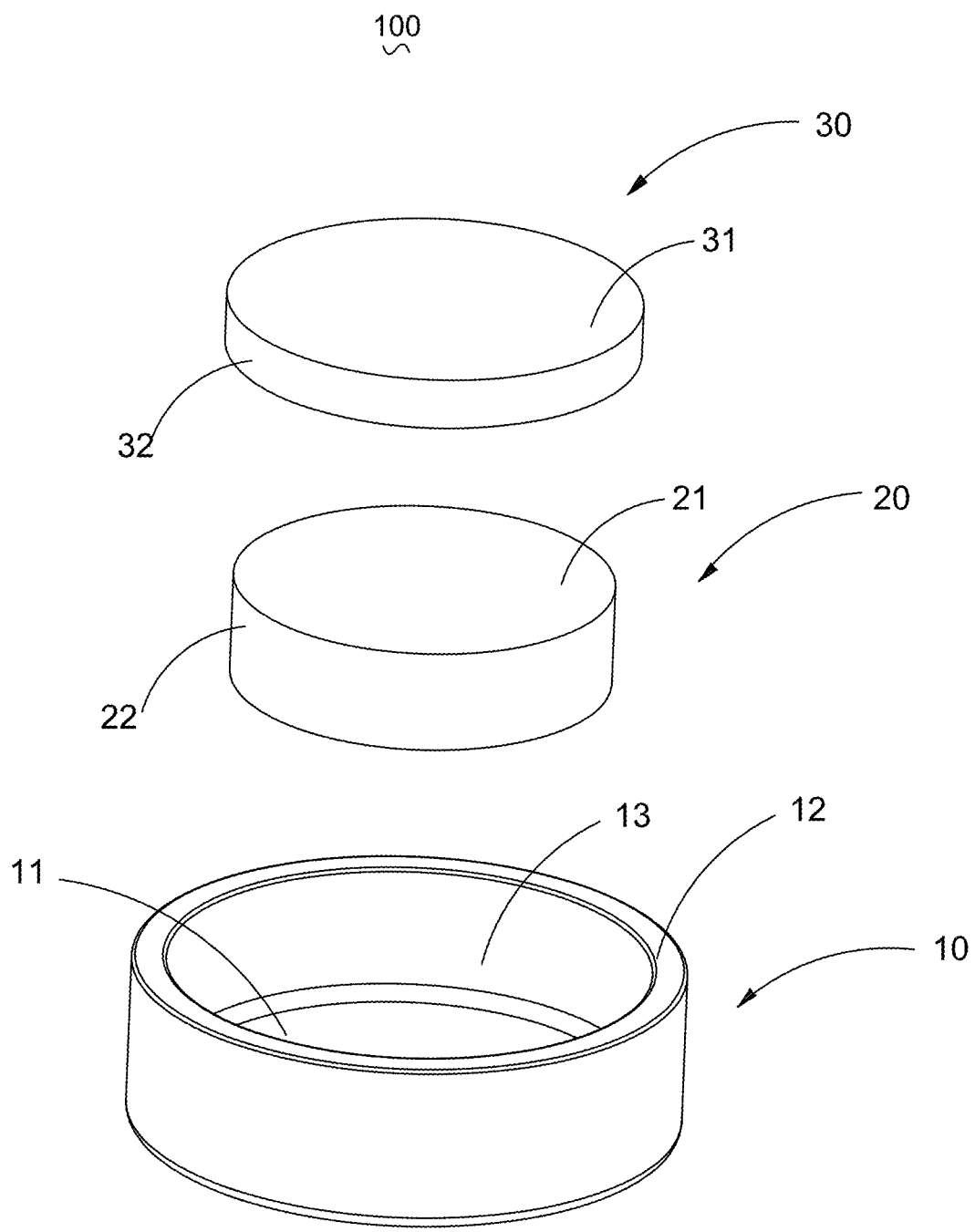
FIG. 2 is an exploded view of the magnetic assembly of FIG. 1.
Figure 3:
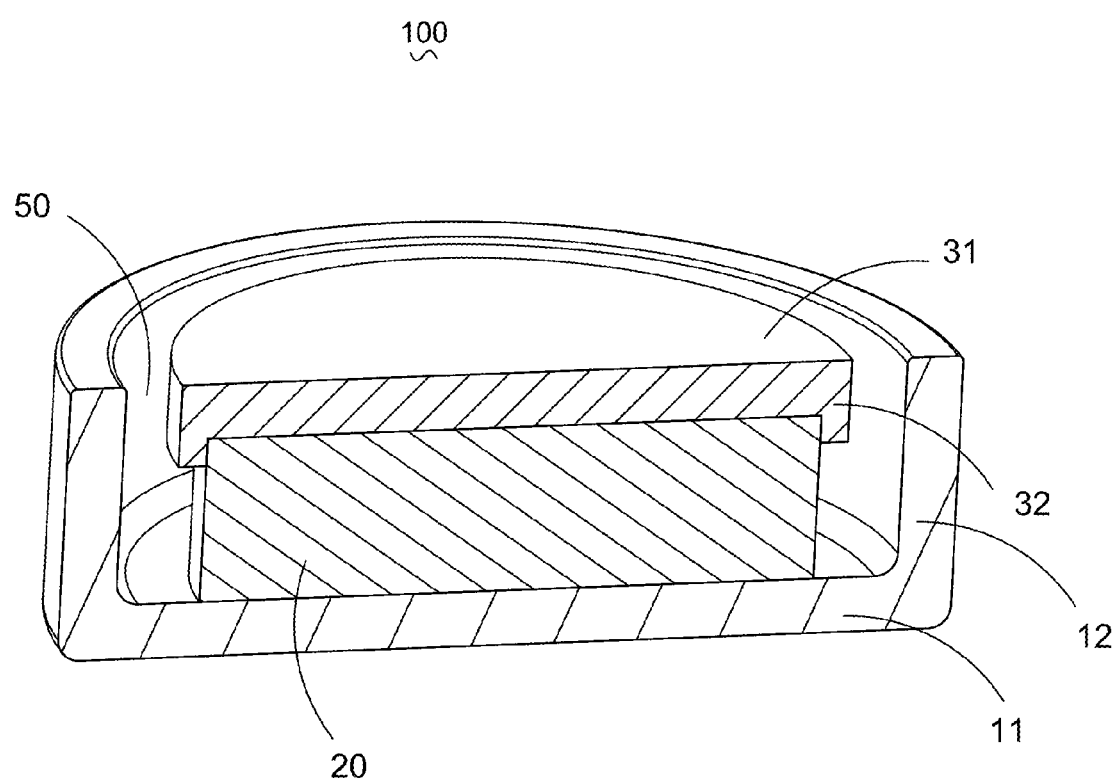
FIG. 3 is a cross-sectional view of the magnetic assembly taken along line A-A of FIG. 1.

Referring to FIG. 1 through FIG. 3, a magnetic assembly 100 according to a first exemplary embodiment of the present disclosure is shown. The magnetic assembly 1 can be applied in a speaker of a mobile device, and includes a yoke 10, a main magnet 20 and a pole plate 30. The main magnet 20 is installed on the yoke 10, and the pole plate 30 is mounted on the main magnet 20.

The yoke 10 is a magnetic yoke which may be made by soft magnetic material with a high magnetic conductivity, such as soft iron, A3 type structural carbon steel, or soft magnetic alloy. The yoke 10 is used for magnetic transmission in a magnetic circuit. The yoke 10 has a substantially cylinder shape and includes a main yoke plate 11 and a side plate 12 extending perpendicularly upward from the main yoke plate 11. The main yoke plate 11 and the side plate 12 connected with each other to form a receiving space 13. It should be noted that the yoke 10 may have other structure in other embodiments, such as a cuboid structure, a cone structure, or the like.

The main magnet 20 is received in the receiving space 13, takes a cylinder shape, and includes a lower surface, an upper surface 21 opposite to the lower surface and an outer circumferential surface 22 locating between the upper surface 21 and the lower surface. The main magnet 20 is spaced from an inner surface of the side plate 12 with the lower surface thereof attached on a central portion of the main yoke plate 11. The magnetic gap 50 is accordingly formed between the inner surface of the side plate 12 of the yoke 10 and the outer circumferential surface 22 of the main magnet 20 as well as the pole plate 30. In the present embodiment, the main magnet 20 may be permanent magnet component. It should be noted that the main magnet 20 may have other structure in other embodiments, such as a rectangular structure, an elliptical structure, or a ring structure.

The pole plate 30 comprises a base plate 31 and a first sidewall 32 extending substantially perpendicularly from a periphery of the base plate 31 toward the main magnet 20 for surrounding the outer circumferential surface 22 of the main magnet 20 and facing the side plate 12 of the yoke 10. The base plate 31 is attached to the upper surface 21 of the main magnet 20 and covers the upper surface 21 of the main magnet 20. The base plate 31 takes a circular shape to match the shape of the main magnet 20. Optionally, the first sidewall 32 is attached to the outer circumferential surface 22 of the main magnet 20. With such configuration, the overlapping area between the yoke and the pole plate increases, in which the magnetic field is evenly distributed. In such case, when electrified, the total harmonic distortion introduced into the speaker can be reduced and the overall performance of the speaker can be improved.

Figure 4:
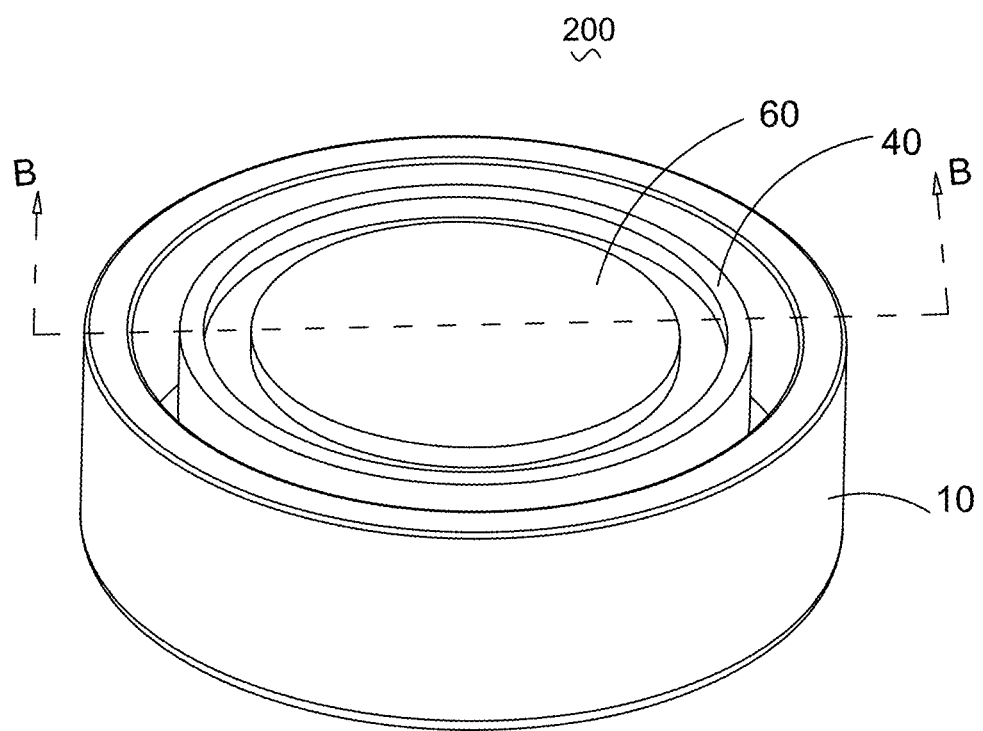
FIG. 4 is an isometric view of a magnetic assembly in accordance with a second embodiment of the present disclosure.
Figure 5:
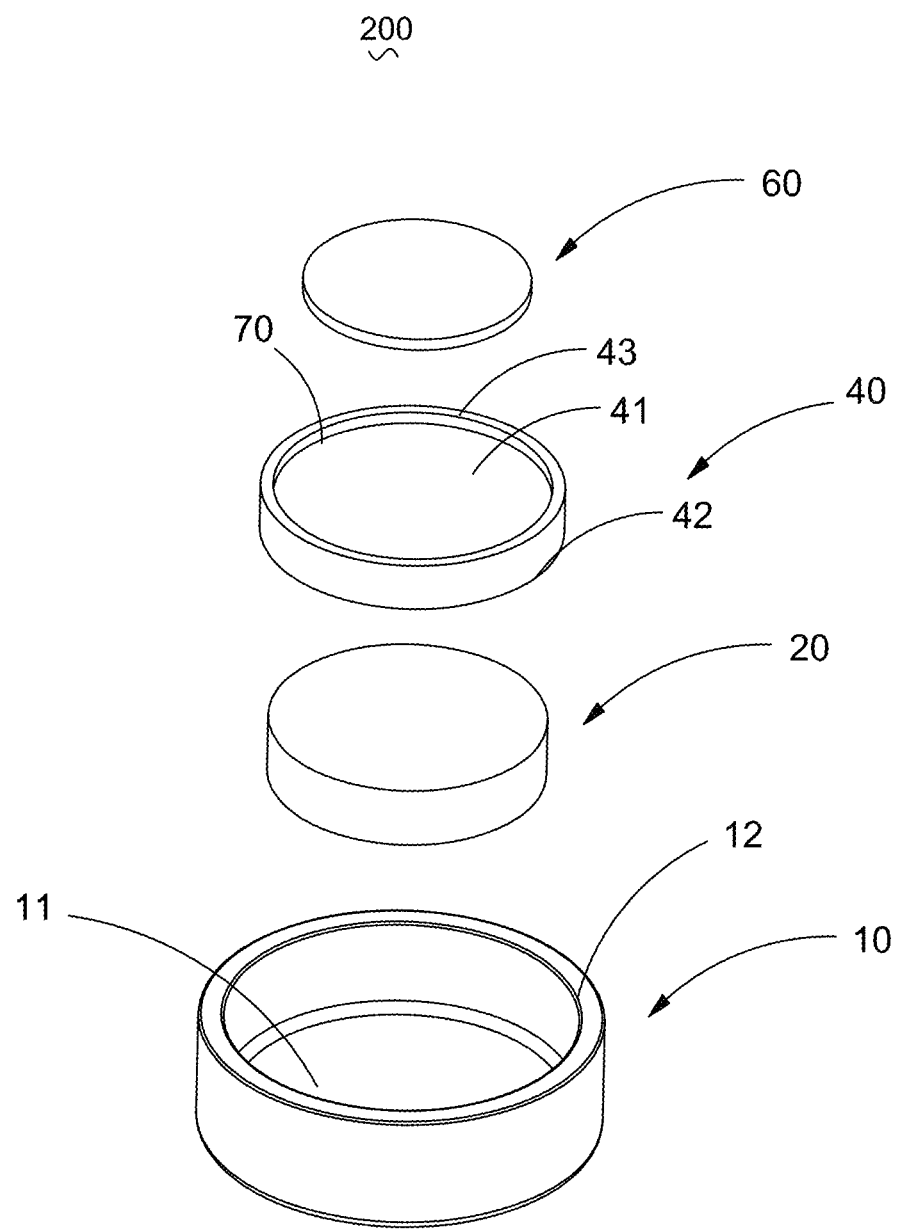
FIG. 5 is an exploded view of the magnetic assembly of FIG. 4.
Figure 6:
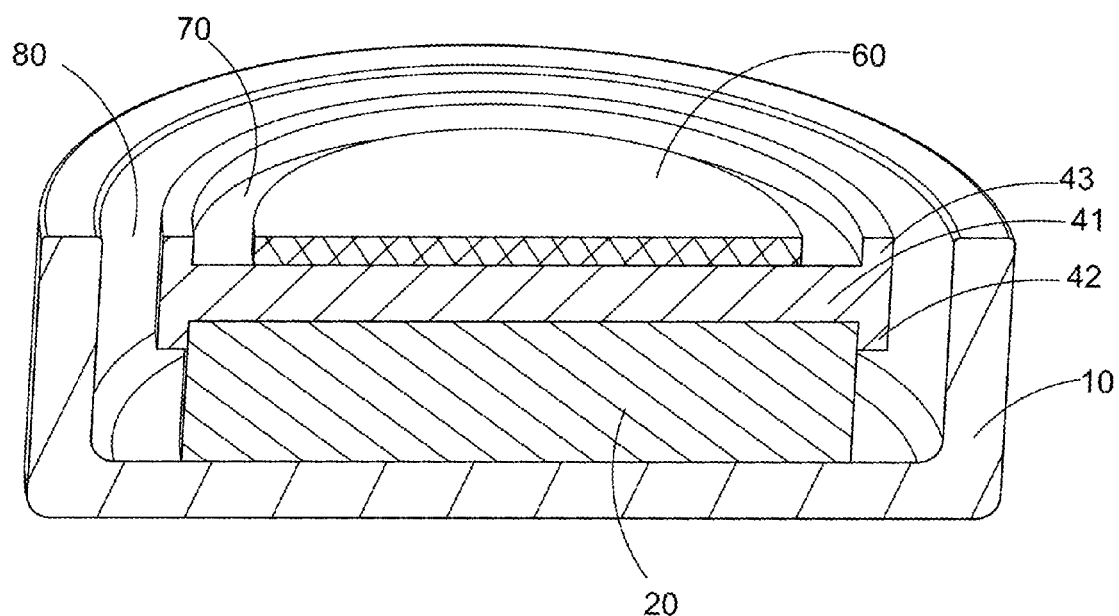
FIG. 6 is a cross-sectional view of the magnetic assembly taken along line B-B of FIG. 4.

Referring to FIG. 4 through FIG. 6, a magnetic assembly 200 according to a second exemplary embodiment of the present disclosure is shown. The magnetic assembly 200 is similar to that illustrated in the first embodiment as shown in FIGS. 1-3. The magnetic assembly 200 includes a yoke 10, a magnet module received in the yoke 10 and a pole plate 40 attached to the magnet module.

The yoke 10 has a base plate 11 and a side plate 12, both of which have a structure identical to that of the first embodiment.

The magnet module has a main magnet 20 that has a structure identical to that of the first embodiment and a secondary magnet 60 received in the yoke 10 and spaced from the main magnet 20. The secondary magnet 60 takes a disc shape. The main magnet 20 and the secondary magnet 60 may be permanent magnet components. A magnetic gap 80 is formed between the inner surface of the side plate 12 of the yoke 10 and the main magnet 20, the secondary magnet 60 as well as the pole plate 40.

The pole plate 40 comprises a base plate 41, a first sidewall 42 extending perpendicularly from the periphery of the base plate 41 toward the main magnet 20 and a second sidewall 43 extending perpendicularly from the periphery of the base plate 41 away from the main magnet 20. The base plate 41 is attached to the upper surface of the main magnet 20. The first sidewall 42 and the second sidewall 43 are formed integrally as one part and parallel to the side plate 12 of the yoke 10. The first sidewall 42 is coplanar with the second sidewall 43. The first sidewall 42 surrounds the main magnet 20 and engages with the outer circumferential surface of the main magnet 20. The second sidewall 43 and the base plate 41 are connected together to form a second receiving space 70, which can receive the secondary magnet 60 while needed. In this embodiment, a top surface of the second sidewall 43 is coplanar with a top surface of the yoke 10. With such configuration, the overlapping area between the yoke and the pole plate increases, in which the magnetic field is evenly distributed. In such case, when electrified, the total harmonic distortion introduced into the speaker can be reduced and the overall performance of the speaker can be improved. In other embodiment, the pole plate also can be constructed as that includes a base plate 41 and a second sidewall 43 extending perpendicularly from the periphery of the base plate 41 away from the main magnet 20, which also can increase the overlapping area between the yoke and the pole plate.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A magnetic assembly, comprising,
   a yoke comprising a receiving space;
   a main magnet received in the receiving space and installed on the yoke;
   a pole plate received in the receiving space, and comprising a base plate attached on the main magnet and a second sidewall extending substantially perpendicularly from the periphery of the base plate away from the main magnet for increasing an overlapping area between the yoke and the pole plate, wherein, a top surface of the second sidewall is coplanar with a top surface of the yoke.

2. The magnetic assembly according to claim 1, further comprising a first sidewall extending perpendicularly from the periphery of the base plate toward the main magnet for surrounding a circumference of the main magnet.

3. The magnetic assembly according to claim 2, wherein the first sidewall and the second sidewall are formed integrally as one part.

4. The magnetic assembly according to claim 3 further comprising a secondary magnet received in the receiving space and spaced from the main magnet;
   wherein the second sidewall and the base plate are connected to each other to form a second receiving space for receiving the secondary magnet.

5. A magnetic assembly for a speaker, comprising,
   a yoke comprising a main yoke plate and a side plate connected with the main yoke plate to form a cavity;
   a first magnet fixed on the main yoke plate within the cavity and spaced from the side plate;
   a pole piece received in the cavity, and comprising a base piece attached on the first magnet and a second sidewall extending perpendicularly from the periphery of the base piece away from the first magnet for increasing an overlapping area between the yoke and the pole piece, wherein, a top surface of the second sidewall is coplanar with a top surface of the yoke.

6. The magnetic assembly for a speaker according to claim 5, further comprises a first sidewall extending perpendicularly from the periphery of the base piece toward the first magnet for surrounding an outer circumferential side of the first magnet.

7. The magnetic assembly for a speaker according to claim 6, wherein the first sidewall and the second sidewall are formed integrally as one part.

8. The magnetic assembly for a speaker according to claim 7 further comprising a second magnet received in the cavity and spaced from the first magnet;
   wherein the second sidewall is assembled with the base case to form an accommodating space for receiving the second magnet.

* * * * *